United States Patent
Kaneko et al.

(10) Patent No.: US 7,495,411 B2
(45) Date of Patent: Feb. 24, 2009

(54) CONTROLLER FOR AN ELECTRIC FOUR-WHEEL-DRIVE VEHICLE

(75) Inventors: Satoru Kaneko, Naka (JP); Shiho Izumi, Hitachi (JP); Tatsuyuki Yamamoto, Mito (JP); Kenta Katsuhama, Hitachinaka (JP); Shigeru Akaishi, Isesaki (JP); Yasuo Matsunaga, Sagamihara (JP); Hidehiko Sugita, Zama (JP)

(73) Assignees: Hitachi, Ltd., Tokyo (JP); Nissan Motor Co., Ltd., Yokohama-shi (JP)

( * ) Notice: Subject to any disclaimer, the term of this patent is extended or adjusted under 35 U.S.C. 154(b) by 49 days.

(21) Appl. No.: 11/657,032

(22) Filed: Jan. 24, 2007

(65) Prior Publication Data

US 2007/0200529 A1    Aug. 30, 2007

(30) Foreign Application Priority Data

Feb. 28, 2006    (JP)    ............................... 2006-052315

(51) Int. Cl.
H02P 27/04    (2006.01)
(52) U.S. Cl. ........................ 318/801; 318/140; 318/800; 180/65.1; 180/65.3
(58) Field of Classification Search ................. 318/140, 318/801, 802, 803, 800; 180/65.1, 65.3
See application file for complete search history.

(56) References Cited

U.S. PATENT DOCUMENTS

| | | | | |
|---|---|---|---|---|
| 5,345,154 A * | 9/1994 | King | ............................ | 318/49 |
| 5,586,613 A * | 12/1996 | Ehsani | ........................ | 180/65.2 |
| 5,589,743 A * | 12/1996 | King | ............................ | 318/139 |
| 5,903,113 A * | 5/1999 | Yamada et al. | ................. | 318/10 |
| 6,087,734 A * | 7/2000 | Maeda et al. | ............... | 290/40 C |
| 6,121,740 A * | 9/2000 | Gale et al. | .................... | 318/376 |
| 6,480,767 B2 * | 11/2002 | Yamaguchi et al. | ............ | 701/22 |
| 7,151,355 B2 * | 12/2006 | Izumi et al. | ................... | 318/801 |
| 7,317,295 B2 * | 1/2008 | Izumi et al. | ................... | 318/801 |

FOREIGN PATENT DOCUMENTS

JP    2005-143285 A    6/2005

* cited by examiner

Primary Examiner—Bentsu Ro
Assistant Examiner—Thai Dinh
(74) Attorney, Agent, or Firm—Crowell & Moring LLP

(57) ABSTRACT

An object of the present invention is to provide a controller for an electric four-wheel-drive vehicle, which is capable of minimizing torque changes and consuming excessive power even when the excessive power is generated by a generator. A motor control unit causes an AC motor to generate desired torque by controlling an inverter. When the power generated by the generator exceeds the power consumed by the inverter and AC motor to generate excessive power, a current command determination unit in the motor control unit consumes the excessive power by increasing a loss in the AC motor.

9 Claims, 12 Drawing Sheets

CONTROLLER FOR AN ELECTRIC FOUR-WHEEL-DRIVE VEHICLE

BACKGROUND OF THE INVENTION

The present invention relates to a controller for an electric four-wheel-drive vehicle that runs while its wheels are driven by engine-generated driving force and its other wheels are driven by motor-generated driving force.

In recent years, an increasing number of automobiles are motor-driven. They are electric automobiles, hybrid automobiles, and other environment-responsive automobiles and electric four-wheel-drive vehicles. These vehicles are mainly characterized by the fact that they carry a battery or engine-driven generator and use the power generated by the battery or generator to drive their wheels with a motor. When front wheels of a vehicle are motor-driven, the vehicle is operated as a front-wheel-drive vehicle so that the motor assists an engine shaft with torque. When, on the other hand, rear wheels of the vehicle are motor-driven, the vehicle is operated as an electric four-wheel-drive vehicle because the front wheels are engine-driven. The electric four-wheel-drive vehicle is an electric automobile that excels in low-micron road run performance and turning performance because its rear wheels are motor-driven. Since it has a dedicated alternator and does not incorporate a battery, it is a low-cost electrical drive system that imposes favorable assembly conditions.

In a system employed by the above-mentioned electric automobiles, hybrid automobiles, and electric four-wheel-drive vehicles, electrical power always flows between the generator and drive motor/inverter. In a system without a battery, for example, electrical power is steadily supplied without causing an electrical power imbalance if the power generated by the generator is equal to the power consumption of (the input power for) the motor/inverter. However, if the power generated by the generator is larger than the power consumption of (the input power for) the motor/inverter, excessive power is generated to charge a smoothing capacitor and raise the voltage of a DC bus. The smoothing capacitor is positioned between the generator and inverter to smooth the input voltage for the inverter. On the contrary, if the power generated by the generator is smaller than the power consumption of (the input power for) the motor/inverter, power insufficiency results. Consequently, the smoothing capacitor may be discharged to lower the voltage of the DC bus (the voltage of an electrical power bus between the generator and inverter), thereby causing torque insufficiency.

A method for furnishing a solution to a situation where the power generated by the generator is larger than the power consumption of (the input power for) the motor/inverter is disclosed, for instance, by JP-A-2005-143285. When excessive power is generated by the generator, the disclosed method consumes the excessive power in a hybrid transmission having at least two motor generators by increasing the torque of a third motor, which is provided in a vehicle drive system. The use of this method makes it possible to inhibit the generator from generating excessive power.

SUMMARY OF THE INVENTION

However, the method disclosed in JP-A-2005-143285 consumes the excessive power as motor torque. Therefore, the resulting generated torque is essentially more than adequate for a vehicle run. Thus, the vehicle may change its behavior and fail to deliver its full-expected driving performance. It is also anticipated that tires may slip depending the road surface conditions.

It is an object of the present invention to provide a controller for an electric four-wheel-drive vehicle, which is capable of minimizing torque changes and consuming excessive power even when the excessive power is generated by the generator.

(1) To achieve the above object, the present invention provides a controller for an electric four-wheel-drive vehicle that includes an internal combustion engine for giving driving force to wheels of an automobile, a generator connected to the internal combustion engine for outputting DC power by using rotational power of the internal combustion engine, an inverter for directly converting the DC power, which is output from the generator, to AC power, and an AC motor for driving the other wheels by using an output from the inverter. The controller includes control means that generates desired torque from the AC motor by controlling the inverter. When the power generated by the generator is larger than the power consumption of the inverter and the AC motor to generate excessive power, the control means consumes the excessive power by increasing a loss in the AC motor.

Even when excessive power is generated by the generator, the use of the above configuration makes it possible to reduce torque changes and consume the excessive power.

(2) It is preferred that the controller according to (1) above further include power storage means that is connected between an output section of the generator and an input section of the inverter. It is also preferred that when the power generated by the generator is larger than the power consumption of the inverter and the AC motor to generate excessive power and the generated excessive power cannot be stored in the power storage means, the control means consume the excessive power by increasing a loss in the AC motor.

(3) It is preferred that when the loss in the AC motor is to be increased, the control means included in the controller according to (1) above increase an armature current in the d-axis direction, which is a rotor flux direction of the AC motor.

(4) It is preferred that when an electrical current flowing to the inverter is within a predetermined range from a maximum value, the control means included in the controller according to (1) above limit a loss increase in the AC motor.

(5) It is preferred that when the temperature of the inverter or the AC motor rises above a predetermined value, the control means included in the controller according to (1) above limit a loss increase in the AC motor.

(6) It is preferred that when the voltage of a smoothing capacitor built in the inverter rises above a predetermined value, the control means included in the controller according to (1) above judge that the excessive power is generated.

(7) It is preferred that the control means included in the controller according to (1) above include generated power monitoring means for calculating the power generated by the generator and input power monitoring means for calculating the power consumption of the AC motor and the inverter. It is also preferred that when an output value generated by the generated power monitoring means is greater than an output value generated by the input power monitoring means by a predetermined value, the control means judge that the excessive power is generated.

(8) It is preferred that when a slip ratio of the wheels driven by the internal combustion engine exceeds a predetermined value, the control means included in the controller according to (1) above consume the excessive power by increasing a loss in the AC motor.

(9) It is preferred that when a monitored voltage of the power storage means exceeds a predetermined value, the control means included in the controller according to (2) above judge that the excessive power is generated.

(10) To achieve the above object, the present invention provides a controller for an electric four-wheel-drive vehicle that includes an internal combustion engine for giving driving force to wheels of an automobile, a generator connected to the internal combustion engine for outputting DC power by using rotational power of the internal combustion engine, an inverter for converting the DC power, which is output from the generator, to AC power, power storage means connected between an output section of the generator and an input section of the inverter, and an AC motor for driving the other wheels by using an output from the inverter. The controller includes control means that generates desired torque from the AC motor by controlling the inverter. When the power generated by the generator is larger than the power consumption of the inverter and the AC motor to generate excessive power and the generated excessive power cannot be stored in the power storage means, the control means consumes the excessive power by increasing a loss in the AC motor.

Even when excessive power is generated by the generator, the use of the above configuration makes it possible to reduce torque changes and consume the excessive power.

Even when excessive power is generated by the generator, the present invention makes it possible to reduce torque changes and consume the excessive power.

DETAILED DESCRIPTION OF THE PREFERRED EMBODIMENTS

A controller for an electric four-wheel-drive vehicle according to a first embodiment of the present invention will now be described with reference to FIGS. 1 to 6.

First of all, the system configuration for an electric four-wheel-drive vehicle to which the controller according to the first embodiment of the present invention is applied will be described with reference to FIG. 1.

Figure 1:
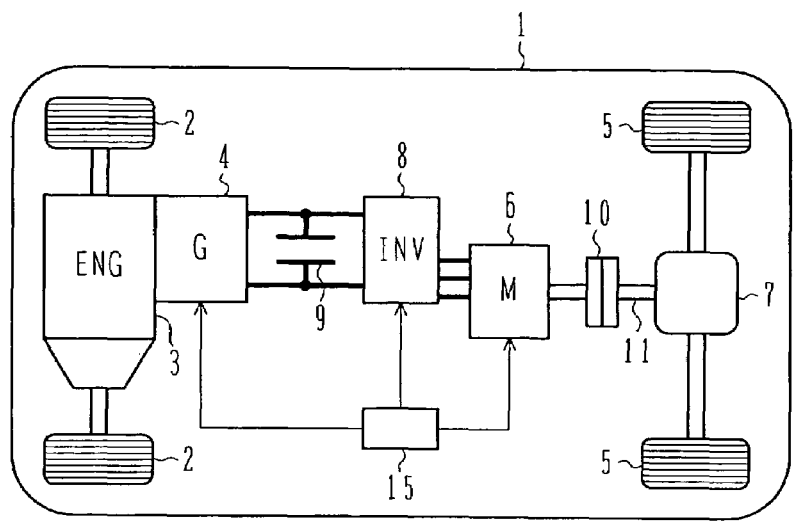
FIG. 1 is a system configuration diagram illustrating an electric four-wheel-drive vehicle to which a controller according to a first embodiment of the present invention is applied.

FIG. 1 is a system configuration diagram illustrating the electric four-wheel-drive vehicle to which the controller according to the first embodiment of the present invention is applied.

In the electric four-wheel-drive vehicle 1, a dedicated generator 4 is connected to an engine 3 that drives front wheels 2. An AC motor 6 generates motive energy on the basis of power generated by the generator 4. The motive energy generated by the AC motor 6 drives rear wheels 5. This motive energy is distributed to the right and left by a differential gear unit 7 and transmitted to the rear wheels 5.

A 4WD clutch 10, which opens and closes a motive energy transmission path, is provided between the AC motor 6 and differential gear unit 7. Further, an inverter 8 is furnished to adjust the torque of the AC motor 6 for a required value. The inverter 8 converts DC power, which is output from the generator 4, to AC power, and supplies the AC power to the AC motor 6. The input section of the inverter 8 handles power that is considerably pulsated by a switching operation of a power device. A capacitor 9 is therefore used to smooth such pulsating power.

The inverter 8, AC motor 6, and generator 4 are controlled by a controller 15.

The electric four-wheel-drive vehicle based on the AC motor is configured as described above. A low-cost system is employed for the electric four-wheel-drive vehicle. The employed system does not incorporate a battery and uses the power generated by the generator 4 to drive the motor.

The present invention can be applied to an electric four-wheel-drive vehicle which runs while its rear wheel are driven by engine-generated driving force and its front wheels are driven by motor-generated driving force.

An electrical power flow in the electric four-wheel-drive vehicle to which the controller according to the first embodiment of the present invention is applied will now be described with reference to FIG. 2.

Figure 2:
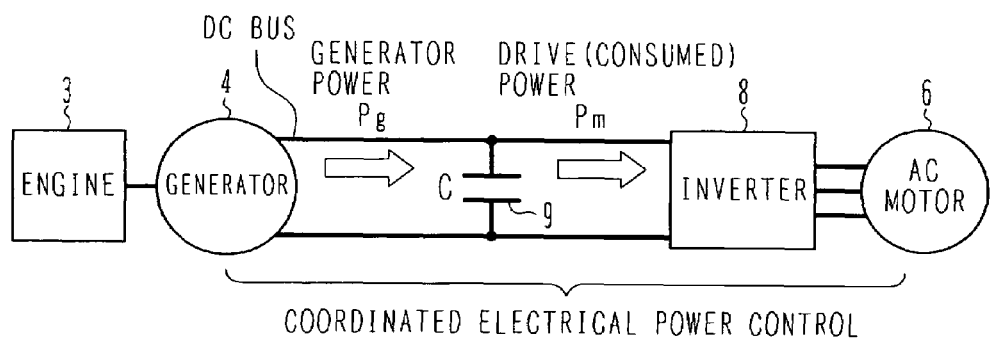
FIG. 2 is an electrical power flow diagram of the electric four-wheel-drive vehicle to which the controller according to the first embodiment of the present invention is applied.

FIG. 2 is an electrical power flow diagram of the electric four-wheel-drive vehicle to which the controller according to the first embodiment of the present invention is applied. Elements shown in FIGS. 1 and 2 are designated by the same reference numerals when they are identical with each other.

FIG. 2 illustrates an electrical power flow between the generator 4 and AC motor 6 in the electric four-wheel-drive vehicle. In a common hybrid vehicle, a battery is connected in parallel with the capacitor 9 as an electrical power generation source and recovery source. As regards an electric four-wheel-drive vehicle, however, it is demanded that its cost be lower than that of a conventional mechanical four-wheel-drive vehicle. In most cases, therefore, the electric four-wheel-drive vehicle does not incorporate a battery.

As described above, the electric four-wheel-drive system based on the AC motor does not have a battery that absorbs electrical power. It is therefore necessary to exercise coordinated electrical power control so that power generation energy Pg, which is output from the engine-driven generator 4, is equal to drive energy Pm, which is input to the inverter 8 and AC motor 6.

However, when the balance between the power generation energy Pg and drive energy Pm is impaired, that is, when, for instance, the power generation energy Pg is greater than the drive energy Pm, excessive electrical power flows into the smoothing capacitor 9, thereby raising the voltage of the DC bus (the voltage of an electrical power bus between the generator and inverter, that is, the smoothing capacitor voltage). If the DC bus voltage exceeds a maximum allowable value, the life of a power device for the capacitor 9 or inverter 8 may be adversely affected. On the other hand, when the power generation energy Pg is smaller than the drive energy Pm, the electrical power stored in the capacitor 9 is consumed by the inverter 8 and AC motor 6. This lowers the voltage, making it practically impossible to output required torque.

The motor 6 can provide highly responsive, highly accurate torque control by exercising electrical current control for a rotating coordinate system (d-q coordinates), that is, vector current control. Meanwhile, power generation control over the generator 4 is exercised by manipulating a field current, which is slow in response. Therefore, power generation control over the generator 4 needs to be exercised accurately in accordance with the behaviors of the inverter 8 and motor 6.

Coordinated electrical power control between the generator 4 and motor 6/inverter 8, which is exercised by the controller according to the present embodiment, will now be described with reference to FIGS. 3 and 4.

Figure 3:
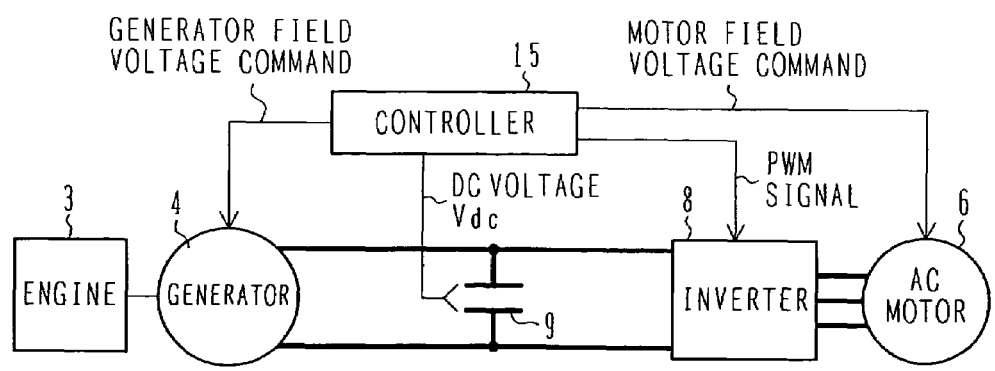
FIG. 3 is a hardware configuration diagram illustrating coordinated electrical power control between a generator and motor/inverter, which is exercised by the controller according to the first embodiment of the present invention.
Figure 4:
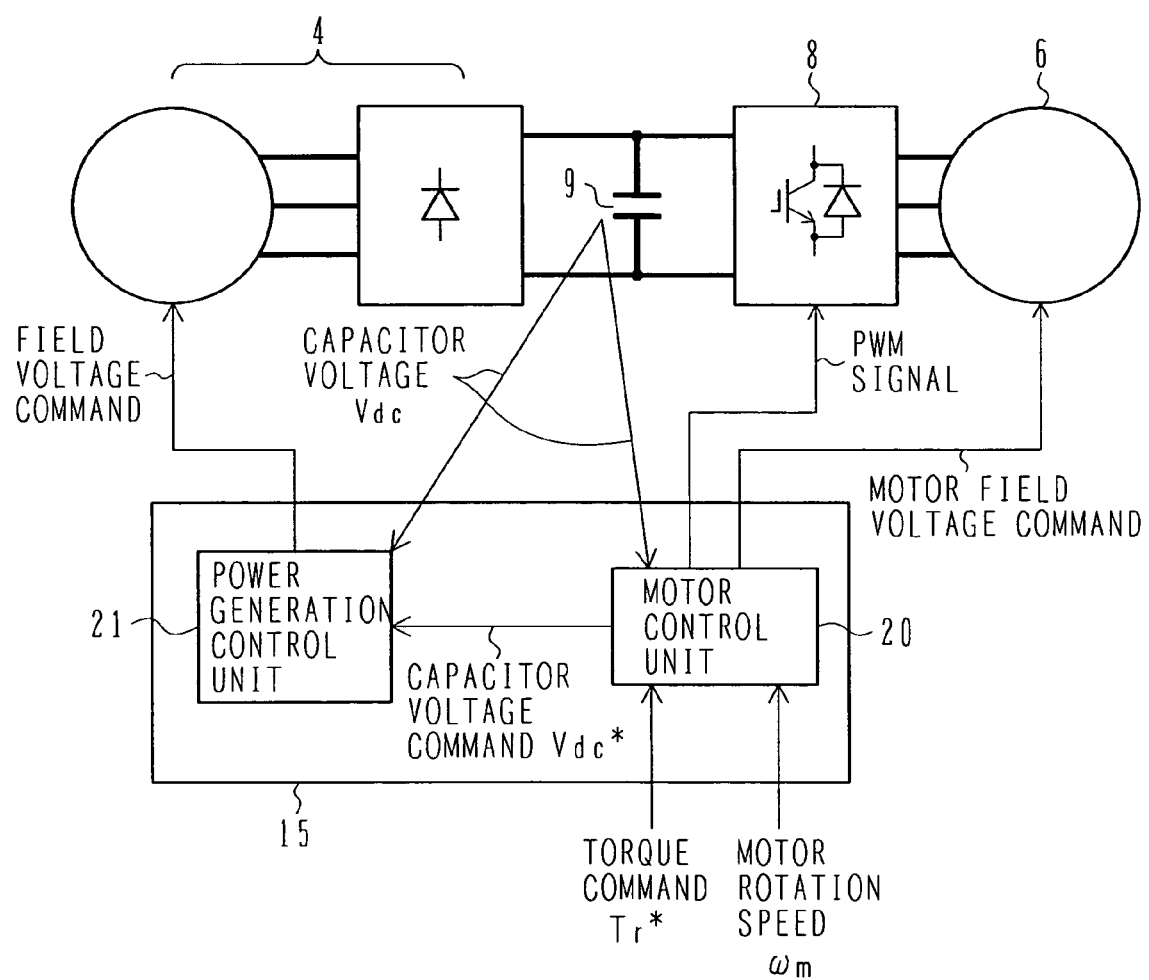
FIG. 4 is a control block diagram illustrating coordinated electrical power control between the generator and motor/inverter, which is exercised by the controller according to the first embodiment of the present invention.

FIG. 3 is a hardware configuration diagram illustrating coordinated electrical power control between the generator and motor/inverter, which is exercised by the controller according to the first embodiment of the present invention. FIG. 4 is a control block diagram illustrating coordinated electrical power control between the generator and motor/inverter, which is exercised by the controller according to the first embodiment of the present invention. Elements shown in FIGS. 1 and 2 and FIGS. 3 and 4 are designated by the same reference numerals when they are identical with each other.

A "DC voltage feedback control method," which feeds back the DC bus voltage (smoothing capacitor voltage), will be described below. A capacitor voltage command Vdc*, which is shown in FIG. 4, corresponds to a command value for the DC bus voltage. In coordinated control, the capacitor voltage Vdc is feedback-controlled in relation to the voltage command Vdc*. When the capacitor voltage Vdc can be steadily controlled in relation to the voltage command Vdc* as described above, coordinated electrical power control can be exercised between the generator and motor/inverter.

The capacitor voltage command Vdc* is determined in accordance with the generator's operating state and motor's operating point (motor rotation speed and motor torque). A motor control unit 20 in the controller 15 exercises motor control in accordance with the voltage Vdc of the DC bus as described above, and outputs a PWM command to the inverter 8 and a field voltage command to the motor 6. Meanwhile, a power generation control unit 21 in the controller 15 exercises power generation control over the generator (dedicated alternator) so that the capacitor voltage Vdc agrees with the command value Vdc*. The power generated by the generator 4 is determined by the rotation speed and magnetic field. Since the rotation speed is determined by the engine speed, the power generation control unit 21 controls the field voltage. While the capacitor voltage Vdc is in agreement with the command value Vdc* (or it is considered that the capacitor voltage Vdc is in agreement with the command value Vdc*), motor control and power generation control are properly balanced with each other so that a coordinated state prevails.

In the above state, the electrical time constant of a stator winding for the motor 6 is on the order of several milliseconds to several tens of milliseconds. Therefore, a very quick electrical response can be made. Meanwhile, the generator 4 is an alternator and a power converter is generally a diode bridge. Therefore, the current on the stator side (voltage vector phase) cannot basically be controlled. The generator 4 exercises field control by using a field winding current whose electrical time constant is generally slow.

Control needs to be exercised so that the motor/inverter and generator respond similarly. In a certain vehicle operation, however, there may be an imbalance between the power consumption of the motor/inverter and the power generated by the generator. This imbalance may cause an increase in the capacitor voltage Vdc of the DC bus. For example, the above-mentioned certain vehicle operation is a connecting operation that is performed by the 4WD clutch 10 at the beginning of four-wheel drive. When the 4WD clutch 10 is to be connected for engagement, it is necessary that the rotation speed of the motor 6 be in agreement with the rotation speed of a drive shaft 11, which depends on a vehicle run state. Therefore, when the rotation speed of the motor 6 coincides with that of the drive shaft 11, the torque is reduced to prevent the motor from accelerating. In this instance, the motor operates in such a direction as to reduce the electrical power. Excessive power may then be generated from the generator.

If the rear wheels slip depending on the road surface conditions when torque is generated by the rear-wheel motor, the motor reduces the torque to stop the slip. In this instance, too, the motor operates in such a direction as to reduce the electrical power. Therefore, excessive power may be generated from the generator.

As described above, the electric four-wheel-drive vehicle may reduce the motor power depending on the type of a vehicle's operation. In such an instance, the generator may fail to reduce its generated power in time, thereby giving rise to excessive power.

When the front wheels suddenly slip, the engine increases its speed so that the generator 4 driven by its rotational power outputs large power. This may give rise to excessive power. As a result, the smoothing capacitor 9 is charged so that the voltage of the DC bus suddenly increases.

As implied by a conventional technology, the motor torque can be increased to prevent the generator from generating excessive power, which causes the above-mentioned sudden increase in the DC voltage. During the vehicle run indicated above, however, an increase in the motor torque may affect the vehicle's behavior. For example, when the torque is increased to connect and engage the 4WD clutch 10 at the beginning of four-wheel drive, a great clutch engagement shock occurs to adversely affect ride comfort. Further, if the motor torque is increased when the rear wheels slip, the probability of slippage may increase. As described above, if the motor torque is increased in order to prevent the generator from generating excessive power, the behavior (driving performance) of the electric four-wheel-drive vehicle may be adversely affected.

Under the above circumstances, the present invention adopts the following method to prevent the generator from generating excessive power without significantly increasing the motor torque. As regards an AC motor, the stator winding current of the motor can be generally resolved into the flux direction of a rotor magnetic field (d-axis) and the direction orthogonal to the flux direction (q-axis). When the current Id in the d-axis direction is increased, the current Id does not affect the motor torque because the current Id is a current in the flux direction. On the other hand, the current in the q-axis direction Iq is a current orthogonal to the flux direction and is therefore a current component that directly constitutes torque. However, if the inductance in the d-axis direction and the inductance in the q-axis direction are not equal (that is, when a salient pole (or reverse salient pole) motor is used), torque (so-called reluctance torque) is generated by the product of current Iq and current Id as indicated by Equation (1) below.

$$T = p \cdot \phi \cdot Iq + p \cdot (Ld - Lq) \cdot Id \cdot Iq \quad (1)$$

Where T is motor torque, p is a polar logarithm, $\phi$ is a field main magnetic flux, Ld is d-axis inductance, and Lq is q-axis inductance.

The second term on the right side of Equation (1) corresponds to a reluctance torque component. It is generally smaller than a torque component that is provided by the main magnetic flux, which is the first term on the right side. As such being the case, the present invention consumes the excessive power generated by the generator mainly by increasing the d-axis current, reducing the torque generated by the excessive power, and increasing the motor's power consumption.

The configuration of the controller according to the present embodiment will now be described with reference to FIGS. 5 and 6.

Figure 5:
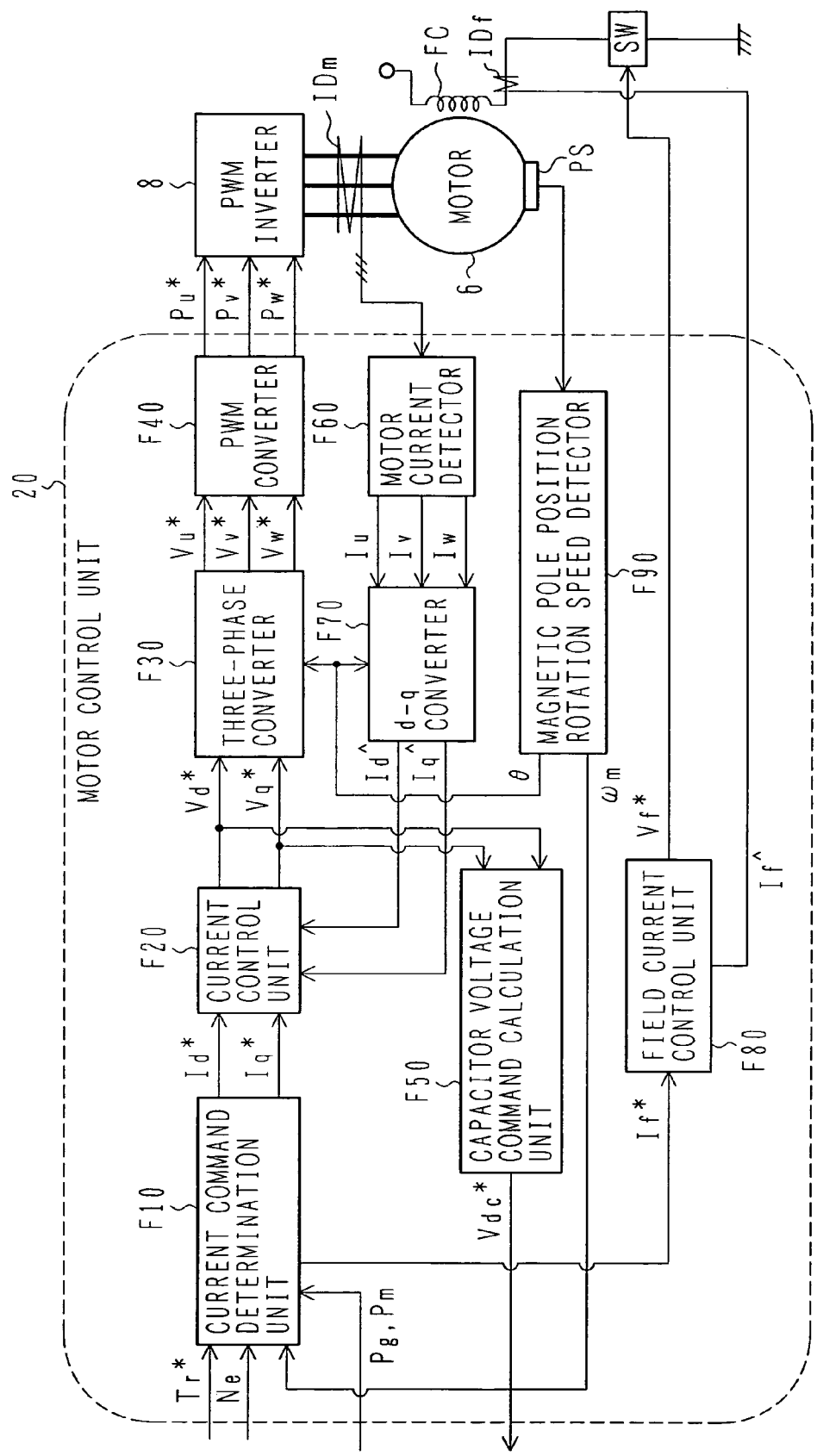
FIG. 5 is a block diagram illustrating the configuration of a motor control unit that is used in the controller according to the first embodiment of the present invention.

FIG. 5 is a block diagram illustrating the configuration of the motor control unit that is used in the controller according to the first embodiment of the present invention. FIG. 6 is a block diagram illustrating the configuration of a current command determination unit that is included in the motor control unit for use in the controller according to the first embodiment of the present invention. Elements shown in FIGS. 1 and 2 and FIGS. 5 and 6 are designated by the same reference numerals when they are identical with each other.

As indicated in FIG. 5, the motor control unit 20 inputs a torque command Tr*, which is calculated in accordance with system control that is provided by the upper-level controller, and outputs a PWM signal to the PWM inverter 8 so that the AC motor 6 generates the torque specified by the torque command Tr*.

The motor control unit 20 includes a current command determination unit F10, a motor current control unit F20, a three-phase converter F30, a PWM converter F40, a capacitor voltage command calculation unit F50, a motor current detector F60, a d-q converter F70, a field current control unit F80, and a magnetic pole position rotation speed detector F90.

The current command determination unit F10 inputs the torque command Tr* and motor angular speed ωm, determines motor current commands Iq*, Id* and field current command If* that provide the highest efficiency at the current operating point, and outputs the determined commands. Id* is a command for the current in the flux direction of the motor rotor (d-axis), whereas Iq* is a command for the current in the direction orthogonal to the flux direction of the motor rotor (q-axis). Further, the power Pg generated by the generator 4 and the input power Pm for the inverter 8 and motor 6 are input to the current command generator F10, and the current command generator F10 references the input power values Pg, Pm when it determines the motor current commands Iq*, Id*. This matter will be described later with reference to FIG. 6.

The motor current control unit F20 performs current control calculations on the rotation coordinate d-q axis to determine voltage commands Vd*, Vq* for the d-q axis. When electrical current control is exercised for the d-q coordinates in this manner, it is possible to accurately control the current in the flux direction and the current in a direction orthogonal to the flux direction (the current that affects the torque). This makes it possible to accurately control the motor torque and flux.

The three-phase converter F30 effects coordinate conversion from the d-q axis to the U-V-W phase, and outputs three-phase AC voltage commands Vu*, Vv*, Vw*. The PWM converter F40 converts the AC voltage commands Vu*, Vv*, Vw* to PWM signals, and outputs the PWM signals to the inverter 8 via a driver.

Feedback values Id^, Iq^, which are used for electrical current control in the motor current control unit F20, are detected as described below. First, motor currents Iu, Iv, Iw detected by a three-phase motor current sensor IDm are acquired by the motor current detector F60, which includes an analog-to-digital converter. The d-q converter F70 then calculates detected currents Id^, Iq^ for the d-q axis, and feeds them back to the motor current control unit F20.

In this control system, the magnetic pole position θ is required for coordinate conversion calculations that are performed to obtain a U-V-W phase voltage command from a d-q coordinate voltage command and a d-q coordinate current from a U-V-W phase current, as described above. Therefore, a position sensor PS is provided for the motor 6. This position sensor PS and the magnetic pole position rotation speed detector F90 in the motor control unit 20 detect a rotor magnetic pole position detection value θc of the AC motor 6. The motor angular speed ωm, which is required for the current command generator F10 and motor current control unit F20, is determined in the magnetic pole position rotation speed detector F90 as a time-variable amount of rotor magnetic pole position detection value θc. (The field current control unit F80 may use a method of measuring rotation pulses from the position sensor Ps with a controller counter and calculating the motor speed from the measured value.)

The field current control unit F80 outputs a field voltage command Vf in accordance with the field current command If*, which is output from the current command determination unit F10, and a field current If^, which is detected by a field current detector IDf and flows to a field winding FC of the motor 6, converts the field voltage command Vf to a duty signal, and turns on/off a switching element SW to control the field current.

The capacitor voltage command calculation unit F50 calculates a capacitor voltage command value Vdc* in accordance with the voltage commands Vd*, Vq* for the d-q axis, which are determined by the motor current control unit F20.

The configuration of the current command determination unit F10 will now be described with reference to FIG. 6. The current command determination unit F10 includes a generated power monitor F10A, an input power monitor F10B, an excessive power calculation unit F10C, a required discharge power calculation unit F10D, a motor current equivalent calculation unit F10E, a current command calculation unit F10F, and a current equivalent calculation unit F10G. The current command calculation unit F10F consumes excessive power by increasing a loss in the AC motor.

The generated power monitor F10A calculates the power Pg generated by the generator 4. The method that the generated power monitor F10A uses to calculate the generated power Pg is not particularly specified. For example, the currently generated power may be calculated from the product of the voltage Vdc of the capacitor 9 and the current Idc (not shown) output from the generator 4 or determined from the engine speed, the field voltage (or field current) of the generator, and Vdc.

The input power monitor F10B calculates the power Pm that is input to (consumed by) the motor 6 and inverter 8. The method that the input power monitor F10B uses to calculate the power Pm is not particularly specified. For example, the currently input power may be calculated from the product of the voltage Vdc of the capacitor 9 and the direct current (not shown) input to the inverter or determined from the motor rotation speed, motor torque command, and inverter/motor efficiency.

The excessive power calculation unit F10C calculates the difference between the generated power Pg and input power Pm to judge whether excessive power is generated. A threshold value for checking for excessive power is predefined. If the difference between the generated power Pg and input power Pm exceeds the predefined threshold value, the excessive power calculation unit F10C judges that excessive power is generated.

When the generation of excessive power is detected, the required discharge power calculation unit F10D and motor current equivalent calculation unit F10E calculate a current increase $\Delta Im\hat{}$ that consumes the excessive power. Basically, the d-axis current Id is increased so that the excessive power is equal to $\Delta Im\hat{}^2 \times R$. $\Delta Im\hat{}$ is an increase in the motor current, whereas R is motor winding resistance. The method for calculating the current increase $\Delta Im\hat{}$ will be described later.

The current command generator F10F inputs the torque command Tr* and motor angular speed ωm, determines a motor current command Im* (q-axis current Iq*, d-axis current Id*) and field current command If* that provide the highest efficiency at the current operating point, and outputs the determined commands.

The motor current increase $\Delta Im\hat{}$ is then added to the motor current Im* that is required for drive. The current equivalent calculation unit F10G calculates a final d-axis current command Id' and q-axis current command Iq' and outputs them. In compliance with these current commands, the motor control unit 20 outputs a PWM signal to the inverter 8, and exercises motor control as indicated in FIG. 5.

Consequently, the present invention can consume the excessive power by increasing the loss in the AC motor.

The final d-axis current command Id' is output as a d-axis current command value Id' in a motor control system that is shown in FIG. 5. FIG. 5 shows the configuration of a control system that exercises feedback control over the d-axis current and q-axis current in relation to a field winding type synchronous motor.

The motor control system according to the present embodiment is not always limited to a feedback control system. It can also be applied to an open-loop control method, which is based on a motor voltage equation, and to a voltage vector phase control method, which is used for one-pulse drive.

Only the process for adjusting the d-axis current is described in conjunction with the present embodiment. However, as is obvious from Equation (1), the output torque more or less varies when the d-axis current is adjusted. In such an instance, the q-axis current is also adjusted in coordination with the d-axis adjustment. This enables the motor to consume the excessive power generated from the generator without causing the output torque to vary.

If excessive power is generated, the present embodiment consumes it by increasing the d-axis current, which is included in the motor current, as described above. Therefore, the present embodiment can consume the excessive power while torque changes are minimized.

The configuration of the controller according to a second embodiment of the present invention will now be described with reference to FIG. 7. The system configuration of an electric four-wheel-drive vehicle to which the controller according to the second embodiment is applied is the same as shown in FIG. 1. The method that the controller according to the present embodiment uses to exercise coordinated electrical power control between the generator and motor/inverter is the same as shown in FIG. 4. The configuration of the motor control unit for use in the controller according to the present embodiment is basically the same as shown in FIG. 5.

Figure 6:
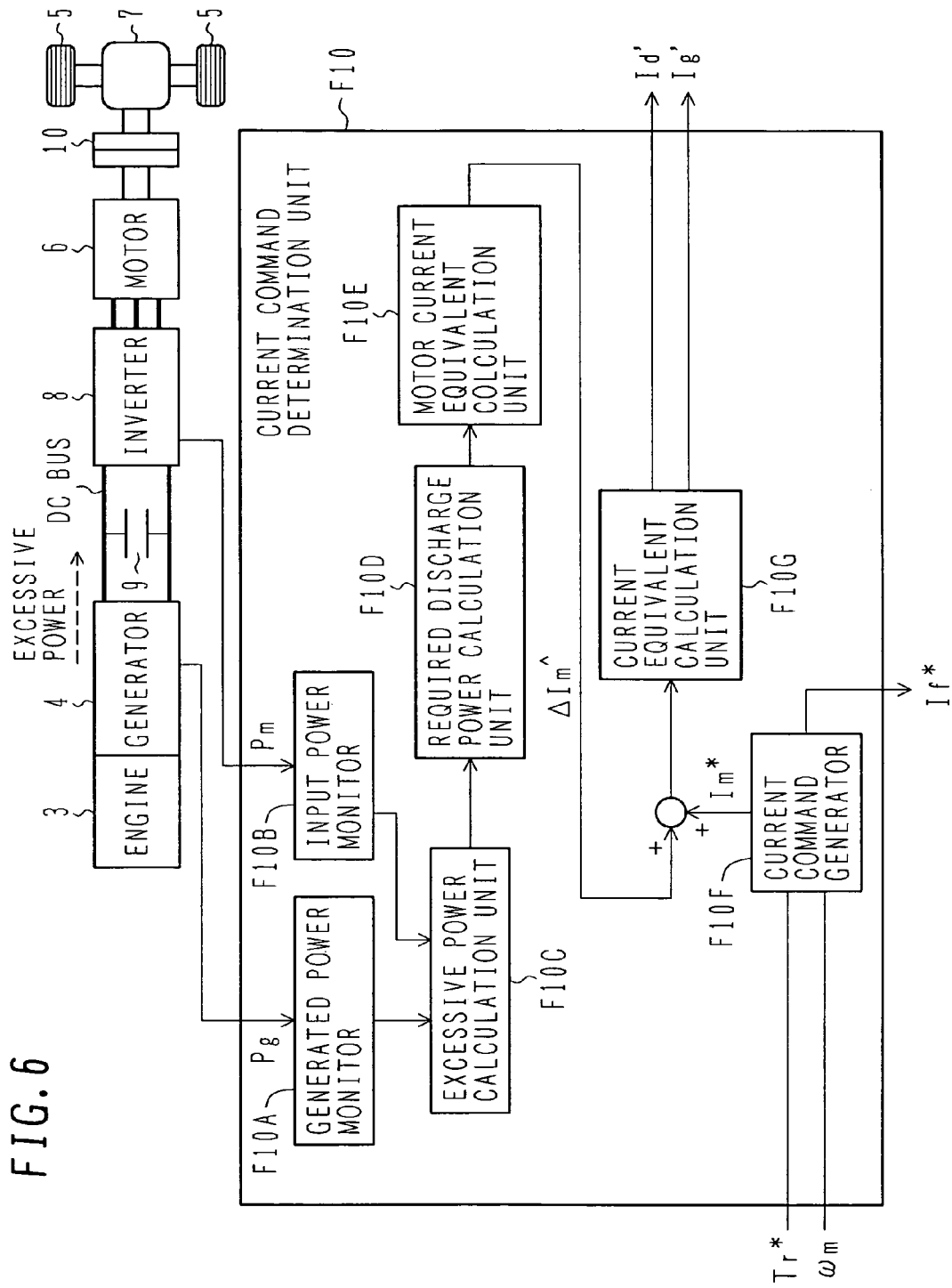
FIG. 6 is a block diagram illustrating the configuration of a current command determination unit that is included in the motor control unit for use in the controller according to the first embodiment of the present invention.
Figure 7:
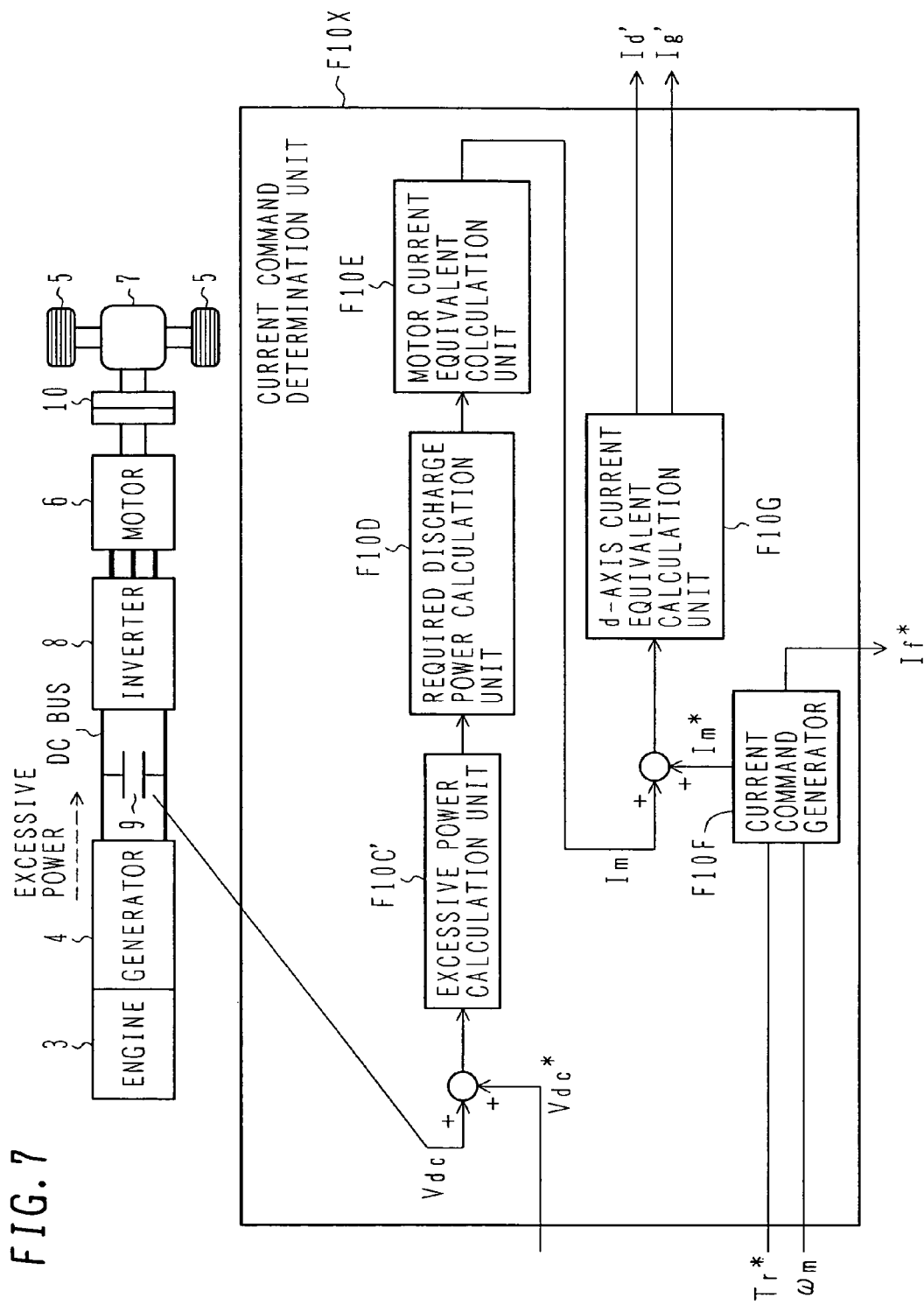
FIG. 7 is a block diagram illustrating the configuration of the current command determination unit that is included in the motor control unit for use in the controller according to a second embodiment of the present invention.

FIG. 7 is a block diagram illustrating the configuration of a current command determination unit that is included in the motor control unit for use in the controller according to the second embodiment of the present invention. Elements shown in FIGS. 6 and 7 are designated by the same reference numerals when they are identical with each other.

The embodiment shown in FIG. 6 calculates the generated power Pg and input power Pm from respective physical quantities. However, the use of such a calculation method may affect the calculation load on the controller 15. Therefore, the present embodiment performs a simplified, proper process. The process that the present embodiment performs to consume the excessive power is basically based on the voltage of the capacitor 9.

The current command determination unit F10X includes an excessive power calculation unit F10C', the required discharge power calculation unit F10D, the motor current equivalent calculation unit F10E, the current command calculation unit F10F, and the current equivalent calculation unit F10G.

The excessive power calculation unit F10C' checks for excessive power by performing calculations on the deviation between the capacitor voltage Vdc and the capacitor voltage command Vdc* for the DC bus section, which is preset in accordance with the operating state of the generator 4 and the required operating point for the motor 6. The capacitor voltage command Vdc* is obtained from the capacitor voltage command calculation unit F50 in the motor control unit 20 shown in FIG. 5. The method employed to detect excessive power is based on the fact that the capacitor voltage with which the capacitor is charged suddenly increases when excessive power is generated. More specifically, when the calculated voltage deviation exceeds a predetermined value, it is judged that excessive power is generated.

The required discharge power calculation unit F10D calculates power that discharges the capacitor until its current voltage Vdc decreases to the level specified by the capacitor voltage command Vdc*.

The method for calculating the discharge power will now be described. The current ΔIdc that discharges the capacitor until its current voltage Vdc decreases to the level specified by the capacitor voltage command Vdc* is determined by Equation (2) below:

$$\Delta Idc = C \times \Delta Vdc / Td \quad (2)$$

where C is capacitor capacitance, ΔVdc is the deviation between the current capacitor voltage Vdc and capacitor voltage command Vdc*, and Td is discharge time.

The power required for discharge ΔW is determined by Equation (3) below:

$$\Delta W = Vdc \times \Delta Idc \quad (3)$$

The motor current equivalent calculation unit F10E calculates a motor current increase ΔIm that generates the required discharge power ΔW. The method for calculating the motor current increase ΔIm is described below.

Equation (4) below is obtained with a view toward allowing the discharge power ΔW to be consumed by a motor loss:

$$\Delta W = \Delta Im^2 \times R \times 3 \quad (4)$$

where Im is a motor current effective value and R is winding resistance.

From Equation (4), the motor current increase ΔIm is determined as indicated below:

$$\Delta Im = \sqrt{(\Delta W / 3R)} \quad (5)$$

In order to consume the excessive power by increasing the d-axis current of the motor, the d-axis current equivalent calculation unit F10G calculates the q-axis current command value Iq' and the d-axis current command value Id' that provides the motor current increase ΔIm. The required overall motor current Im is determined by Equation (6) below:

$$Im = \Delta Im + Im^* \quad (6)$$

where the current Im* represents a motor current command value (effective value) for a situation where no excessive power is consumed.

The motor current phase angle θI is determined from Equation (7) below:

$$\theta I = \cos^{-1}(Iq - /\sqrt{(3)}Im) \quad (7)$$

Therefore, the final d-axis current command Id' required for discharging the capacitor whose voltage is increased by excessive power is calculated as indicated below:

$$Id' = Im \times \sin\theta I \quad (8)$$

As described above, the method according to the present embodiment causes the d-axis current equivalent calculation unit F10G to calculate the final d-axis current command Id'.

When excessive power is generated, the present embodiment consumes it by increasing the d-axis current, which is included in the motor current, as described above. Therefore, the present embodiment can consume the excessive power while torque changes are minimized.

In addition, the present embodiment makes it possible to calculate the excessive power properly in a simplified manner.

The configuration of the controller according to a third embodiment of the present invention will now be described with reference to FIG. 8. The system configuration of an electric four-wheel-drive vehicle to which the controller according to the third embodiment is applied is the same as shown in FIG. 1. The method that the controller according to the present embodiment uses to exercise coordinated electrical power control between the generator and motor/inverter is the same as shown in FIG. 4. The configuration of the motor control unit for use in the controller according to the present embodiment is the same as shown in FIG. 5.

Figure 8:
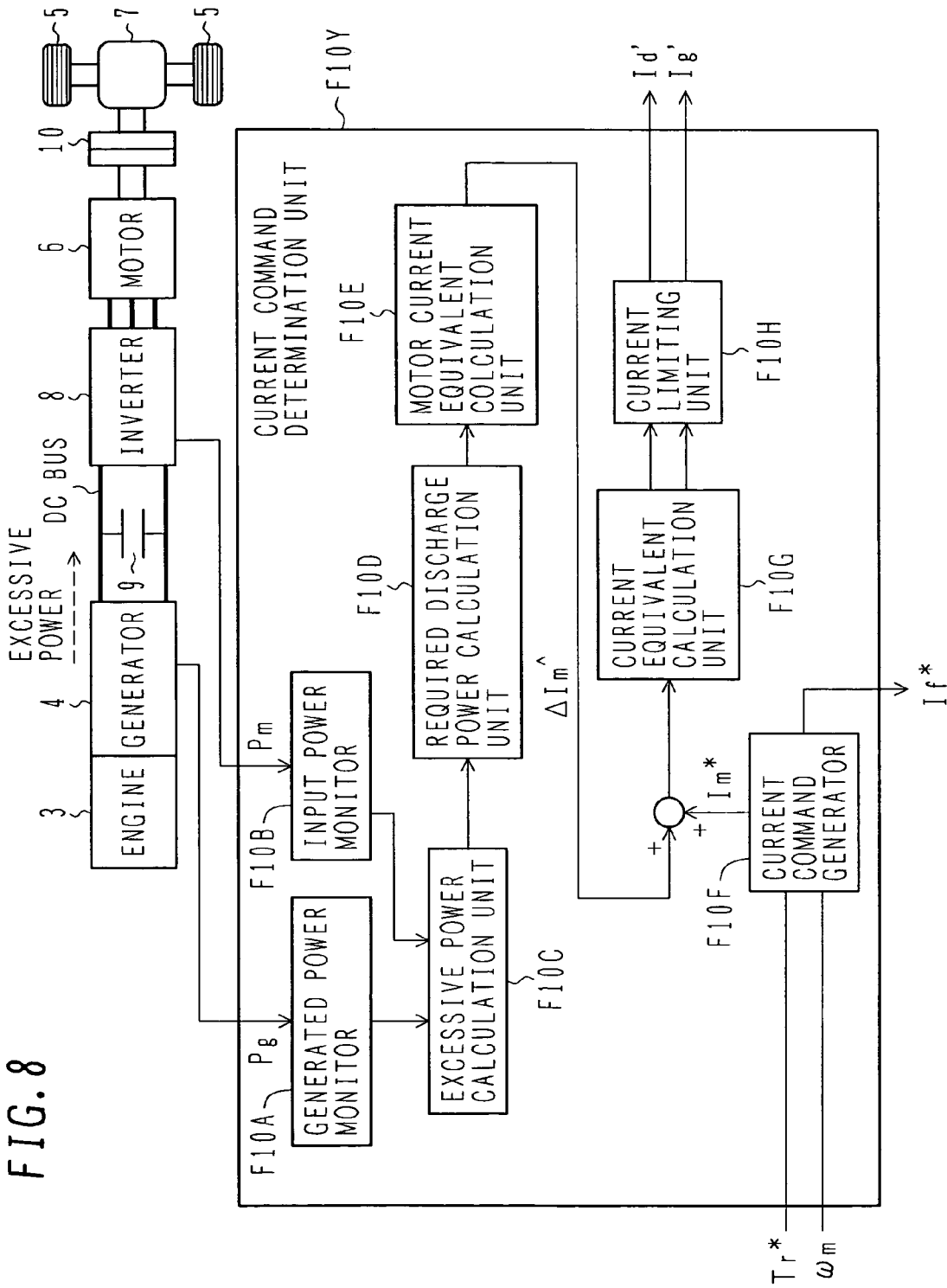
FIG. 8 is a block diagram illustrating the configuration of the current command determination unit that is included in the motor control unit for use in the controller according to a third embodiment of the present invention.

FIG. 8 is a block diagram illustrating the configuration of a current command determination unit that is included in the motor control unit for use in the controller according to the third embodiment of the present invention. Elements shown in FIGS. 6 and 8 are designated by the same reference numerals when they are identical with each other.

The current command determination unit F10Y included in the present embodiment differs from the current command determination unit F10 shown in FIG. 6 in that a current limiting unit F10H is furnished and positioned after the current equivalent calculation unit F10G. In the examples shown in FIGS. 6 and 7, the d-axis current is increased to increase the motor loss. However, the d-axis current cannot be allowed to flow in excess of the maximum allowable current for the inverter and motor. In the present embodiment, therefore, the current limiting unit F10H is furnished to limit the motor loss, which should be increased, when the motor current is smaller than the maximum allowable current and equal to a predetermined current value, which is smaller than the maximum allowable current by a margin.

When excessive power is generated, the present embodiment consumes it by increasing the d-axis current, which is included in the motor current, as described above. Therefore, the present embodiment can consume the excessive power while torque changes are minimized.

The configuration of the controller according to a fourth embodiment of the present invention will now be described with reference to FIG. 9. The system configuration of an electric four-wheel-drive vehicle to which the controller according to the fourth embodiment is applied is the same as shown in FIG. 1. The method that the controller according to the present embodiment uses to exercise coordinated electrical power control between the generator and motor/inverter is the same as shown in FIG. 4. The configuration of the motor control unit for use in the controller according to the present embodiment is the same as shown in FIG. 5.

Figure 9:
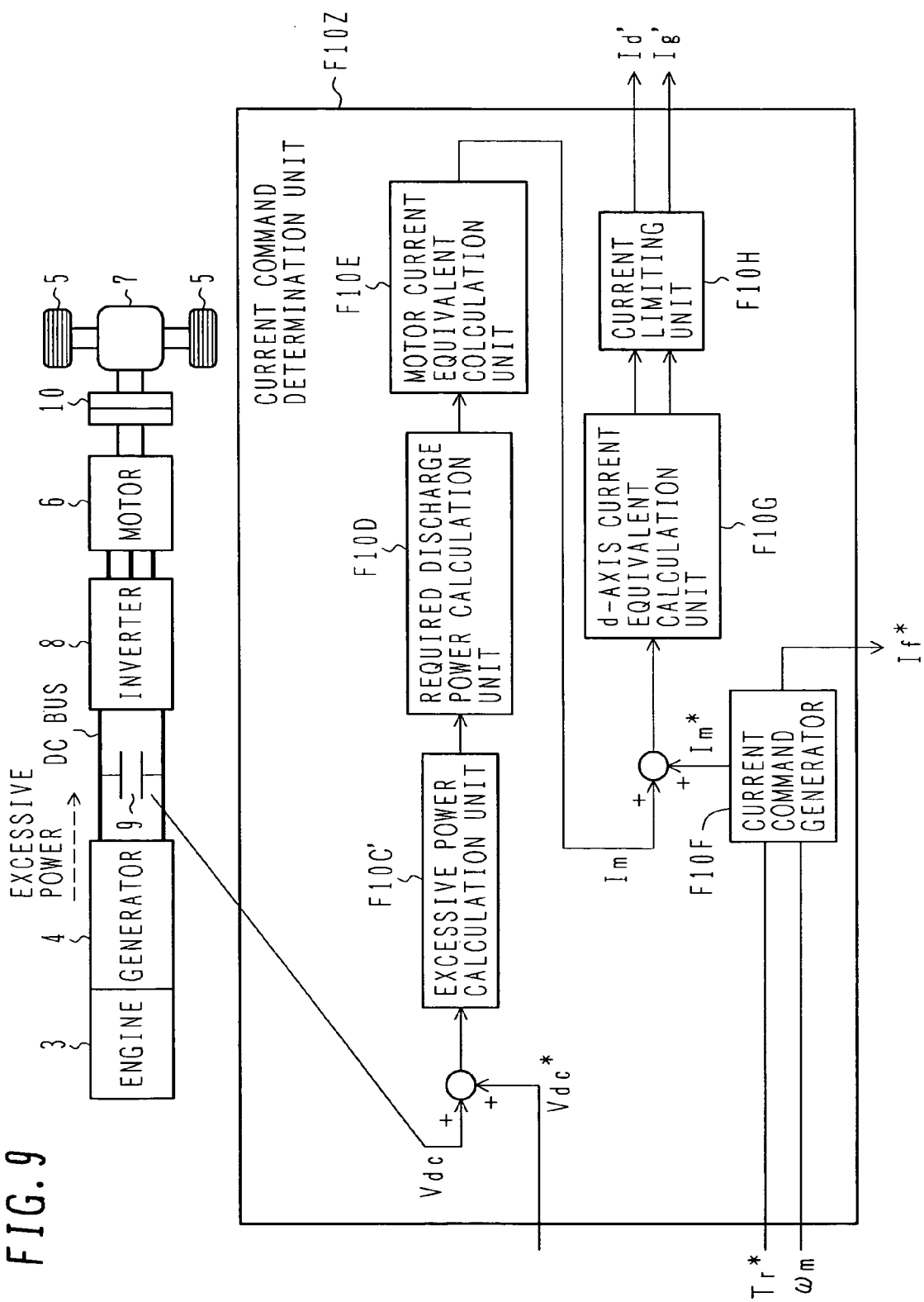
FIG. 9 is a block diagram illustrating the configuration of the current command determination unit that is included in the motor control unit for use in the controller according to a fourth embodiment of the present invention.

FIG. 9 is a block diagram illustrating the configuration of a current command determination unit that is included in the motor control unit for use in the controller according to the fourth embodiment of the present invention. Elements shown in FIGS. 7 and 9 are designated by the same reference numerals when they are identical with each other.

The current command determination unit F10Z included in the present embodiment differs from the current command determination unit F10X shown in FIG. 7 in that the current limiting unit F10H is furnished and positioned after the current equivalent calculation unit F10G. In the examples shown in FIGS. 6 and 7, the d-axis current is increased to increase the motor loss. However, the d-axis current cannot be allowed to flow in excess of the maximum allowable current for the inverter and motor. In the present embodiment, therefore, the current limiting unit F10H is furnished to limit the motor loss, which should be increased, when the motor current is smaller than the maximum allowable current and equal to a predetermined current value, which is smaller than the maximum allowable current by a margin.

When excessive power is generated, the present embodiment consumes it by increasing the d-axis current, which is included in the motor current, as described above. Therefore, the present embodiment can consume the excessive power while torque changes are minimized.

The configuration of the controller according to a fifth embodiment of the present invention will now be described with reference to FIGS. 10 and 11. The system configuration of an electric four-wheel-drive vehicle to which the controller according to the fifth embodiment is applied is the same as shown in FIG. 1. The method that the controller according to the present embodiment uses to exercise coordinated electrical power control between the generator and motor/inverter is the same as shown in FIG. 4. The configuration of the motor control unit for use in the controller according to the present embodiment is the same as shown in FIG. 5.

Figure 10:
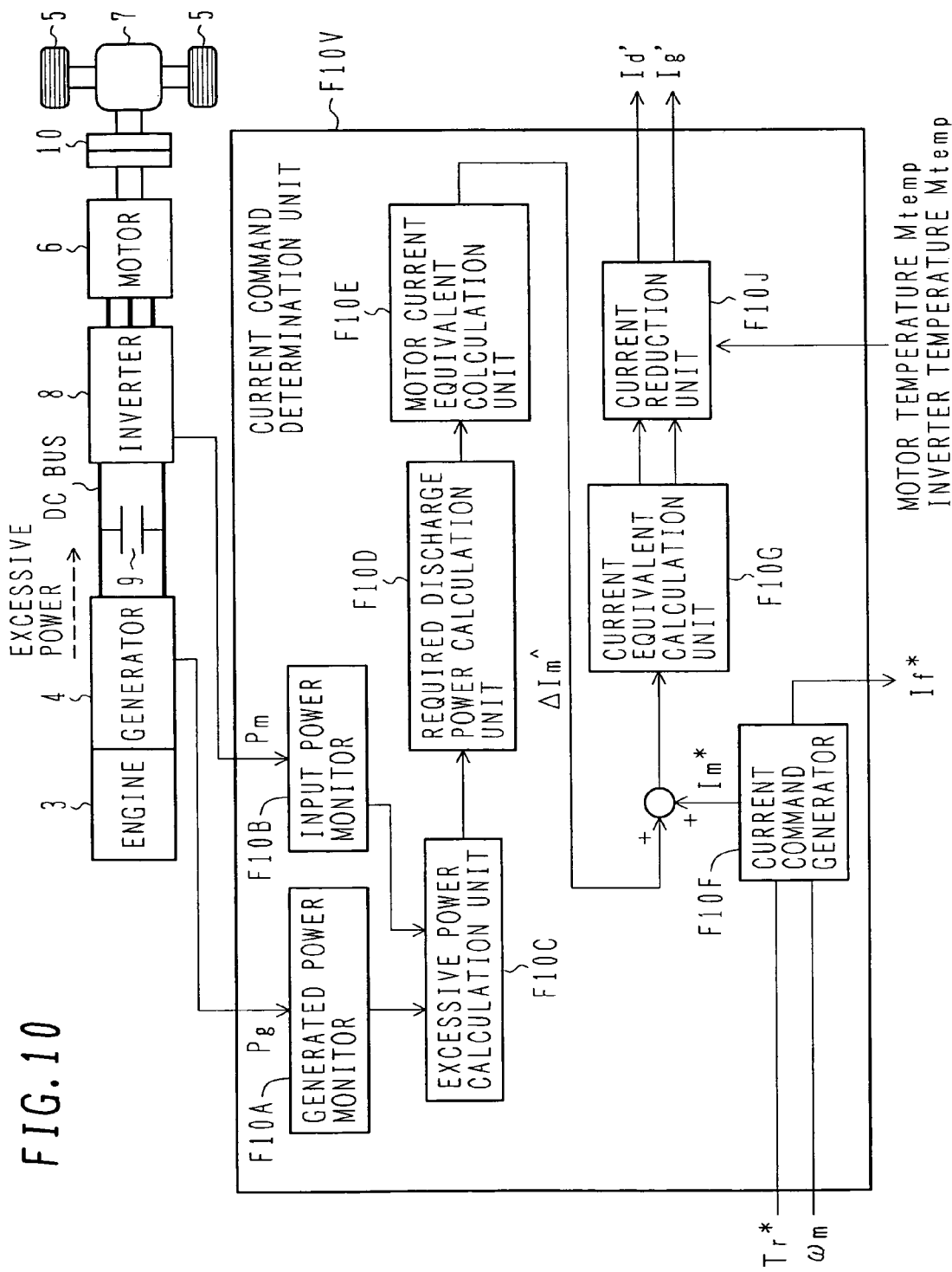
FIG. 10 is a block diagram illustrating the configuration of the current command determination unit that is included in the motor control unit for use in the controller according to a fifth embodiment of the present invention.
Figure 11:
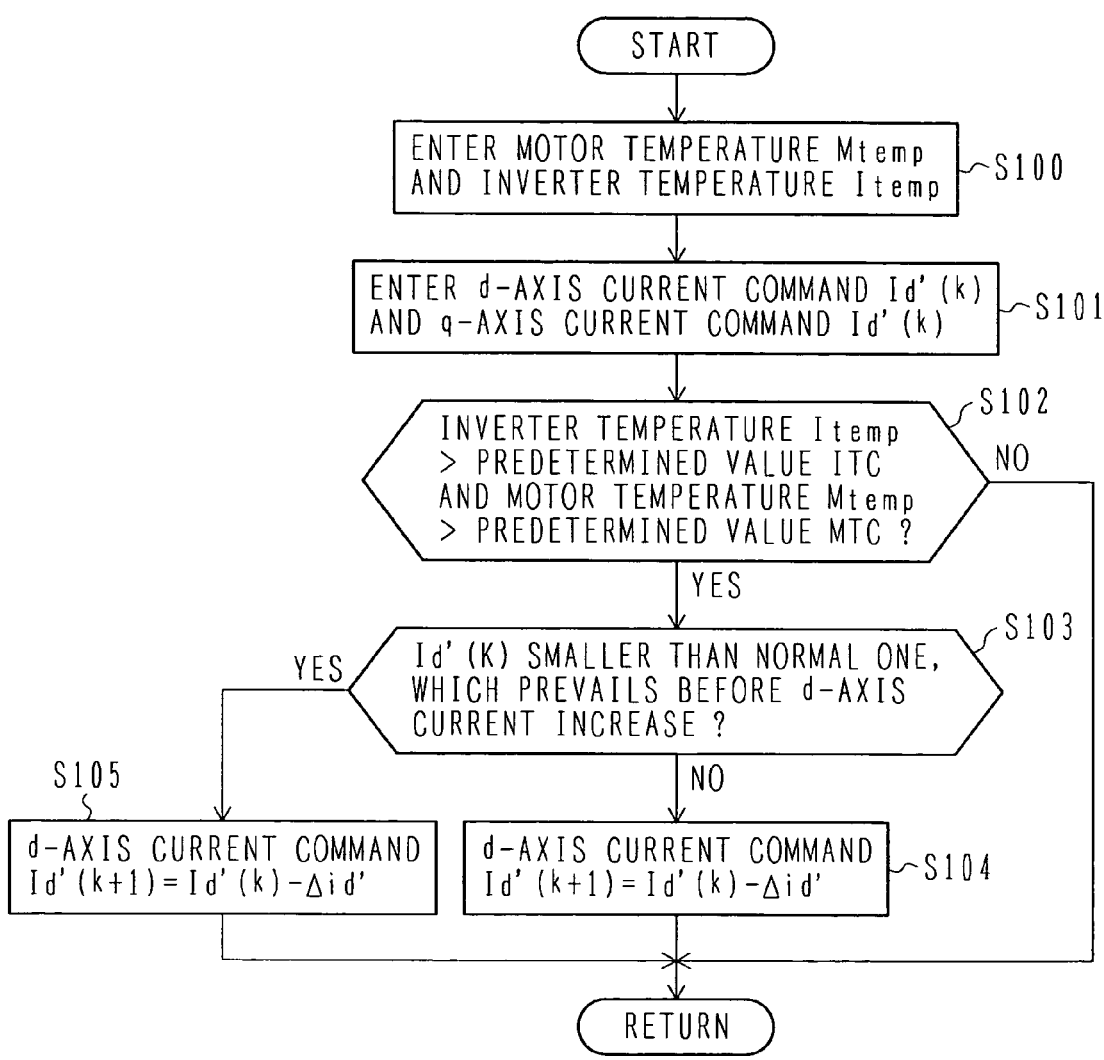
FIG. 11 is a flowchart illustrating an operation that is performed by a current reduction unit, which is included in the current command determination unit for use in the controller according to the fifth embodiment of the present invention.

FIG. 10 is a block diagram illustrating the configuration of a current command determination unit that is included in the motor control unit for use in the controller according to the fifth embodiment of the present invention. FIG. 11 is a flowchart illustrating an operation that is performed by a current reduction unit, which is included in the current command determination unit for use in the controller according to the fifth embodiment of the present invention. Elements shown in FIGS. 6 and 10 are designated by the same reference numerals when they are identical with each other.

The current command determination unit F10V included in the present embodiment differs from the current command determination unit F10 shown in FIG. 6 in that the current reduction unit F10J is furnished and positioned after the current equivalent calculation unit F10G. In the examples shown in FIGS. 6 and 7, the d-axis current is increased to increase the motor loss. However, when the d-axis current is allowed to flow for a long period of time, the loss in the inverter and motor increases, thereby causing the inverter and motor to generate heat. Therefore, the current reduction unit F10J is furnished to monitor the inverter temperature (Itemp) and motor temperature (Mtemp) and reduce the current until the temperatures decrease to predetermined permissible values.

The operation performed by the current reduction unit F10J will now be described with reference to FIG. 11. In step S100, which is shown in FIG. 11, the current reduction unit F10J enters the motor temperature Mtemp and inverter temperature Itemp. In step S101, the current reduction unit F10J enters a d-axis current command Id' (k) and a q-axis current command Iq' (k).

In step S102, the current reduction unit F10J judges whether the entered current motor temperature Mtemp is higher than a predetermined maximum motor temperature MTC and the entered current inverter temperature Itemp is higher than a predetermined maximum inverter temperature ITC. If the motor temperature Mtemp and inverter temperature Itemp are not higher than their respective predetermined temperatures (MTC and ITC), the process terminates, allowing the current control unit F20 to exercise current control.

If, on the other hand, the judgment result obtained in step S102 indicates that the motor temperature Mtemp or inverter temperature Itemp is higher than the predetermined temperature (MTC or ITC), step S103 is performed to compare the present d-axis current command Id', which is regarded as a command for loss increase, against the normal d-axis current command, which prevails before a current command increase.

If the present d-axis current command Id' is greater than the normal d-axis current command, step S104 is performed to decrease the d-axis current command value Id' by $\Delta$id'. If, on the other hand, the judgment result obtained in step S103 indicates that the present d-axis current command Id' is smaller than the normal d-axis current command, step S105 is performed to decrease the q-axis current command value Iq' by $\Delta$iq'. If the d-axis current command needs to be rendered smaller than the normal current command, the q-axis current (not the d-axis current), that is, the motor torque, is reduced as described above to lower the motor or inverter temperature.

The amount of a single current reduction ($\Delta$id', $\Delta$iq') should be determined as appropriate in accordance with motor and inverter specifications.

Even when the loss is increased until the motor or inverter temperature rises to a level close to the maximum permissible temperature, the current reduction unit F10J can decrease the motor and inverter temperatures, as described above, until they reach a permissible level.

When excessive power is generated, the present embodiment consumes it by increasing the d-axis current, which is included in the motor current, as described above. Therefore, the present embodiment can consume the excessive power while torque changes are minimized.

The configuration of the controller according to a sixth embodiment of the present invention will now be described with reference to FIG. 12. The system configuration of an electric four-wheel-drive vehicle to which the controller according to the sixth embodiment is applied is the same as shown in FIG. 1. The method that the controller according to the present embodiment uses to exercise coordinated electrical power control between the generator and motor/inverter is the same as shown in FIG. 4. The configuration of the motor control unit for use in the controller according to the present embodiment is the same as shown in FIG. 5.

Figure 12:
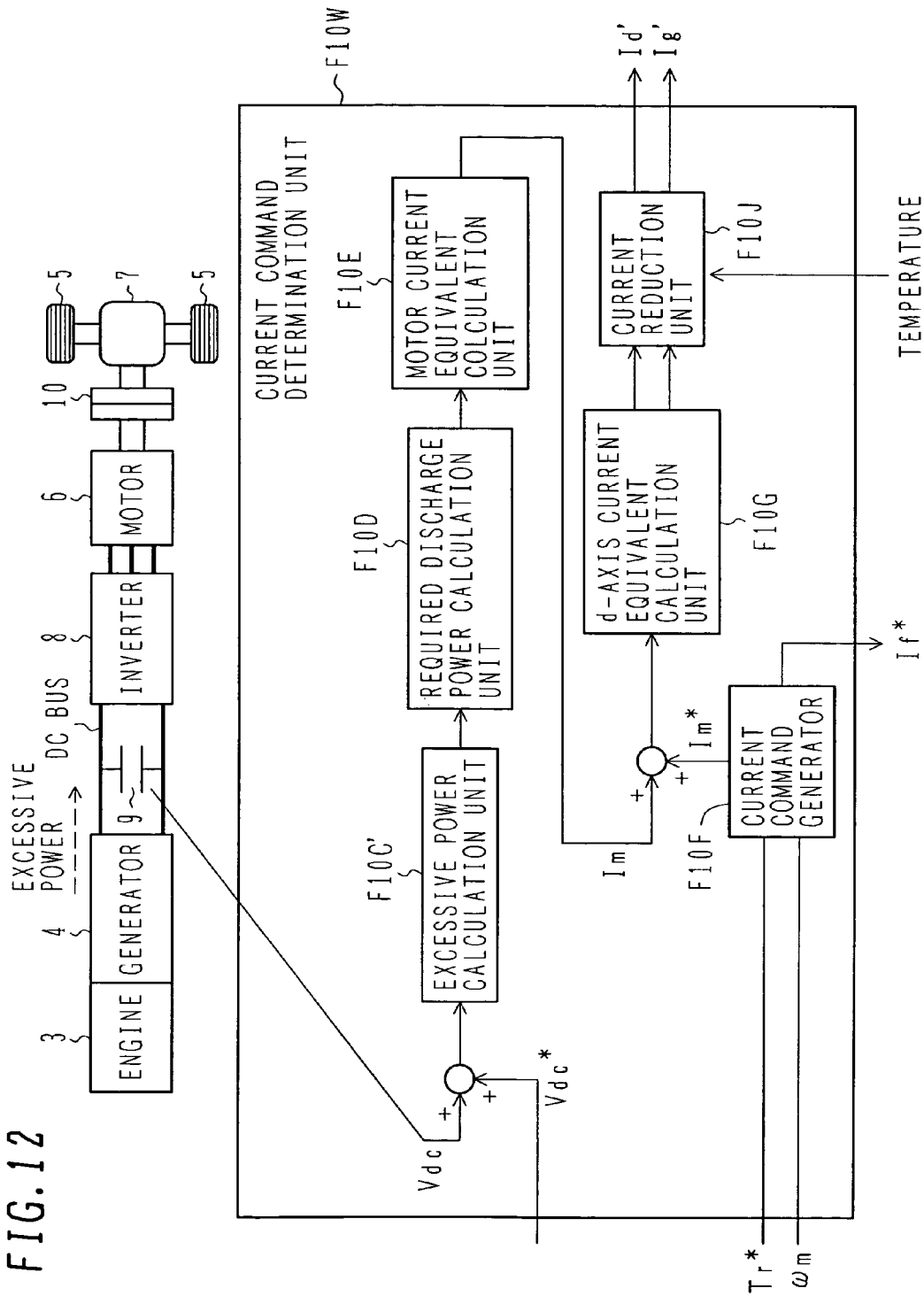
FIG. 12 is a block diagram illustrating the configuration of the current command determination unit that is included in the motor control unit for use in the controller according to a sixth embodiment of the present invention.

FIG. 12 is a block diagram illustrating the configuration of a current command determination unit that is included in the motor control unit for use in the controller according to the sixth embodiment of the present invention. Elements shown in FIGS. 7 and 11 are designated by the same reference numerals when they are identical with each other.

The current command determination unit F10W included in the present embodiment differs from the current command determination unit F10X shown in FIG. 7 in that the current reduction unit F10J is furnished and positioned after the current equivalent calculation unit F10G. In the examples shown in FIGS. 6 and 7, the d-axis current is increased to increase the motor loss. However, when the d-axis current is allowed to flow for a long period of time, the loss in the inverter and motor increases, thereby causing the inverter and motor to generate heat. Therefore, the current reduction unit F10J is furnished to monitor the inverter and motor temperatures and reduce the current until the temperatures decrease to predetermined permissible values.

When excessive power is generated, the present embodiment consumes it by increasing the d-axis current, which is included in the motor current, as described above. Therefore, the present embodiment can consume the excessive power while torque changes are minimized.

If, in the examples shown in FIGS. 6 to 12, the excessive power raises the capacitor voltage while the excessive power cannot be consumed by increasing the loss in the motor, a discharge resistance circuit or other overvoltage protector may be employed to avoid a voltage rise.

The configuration of the controller according to a seventh embodiment of the present invention will now be described with reference to FIG. 13. The system configuration of an electric four-wheel-drive vehicle to which the controller according to the seventh embodiment is applied is the same as shown in FIG. 1. The method that the controller according to the present embodiment uses to exercise coordinated electrical power control between the generator and motor/inverter is the same as shown in FIG. 4. The configuration of the motor control unit for use in the controller according to the present embodiment is the same as shown in FIG. 5.

Figure 13:
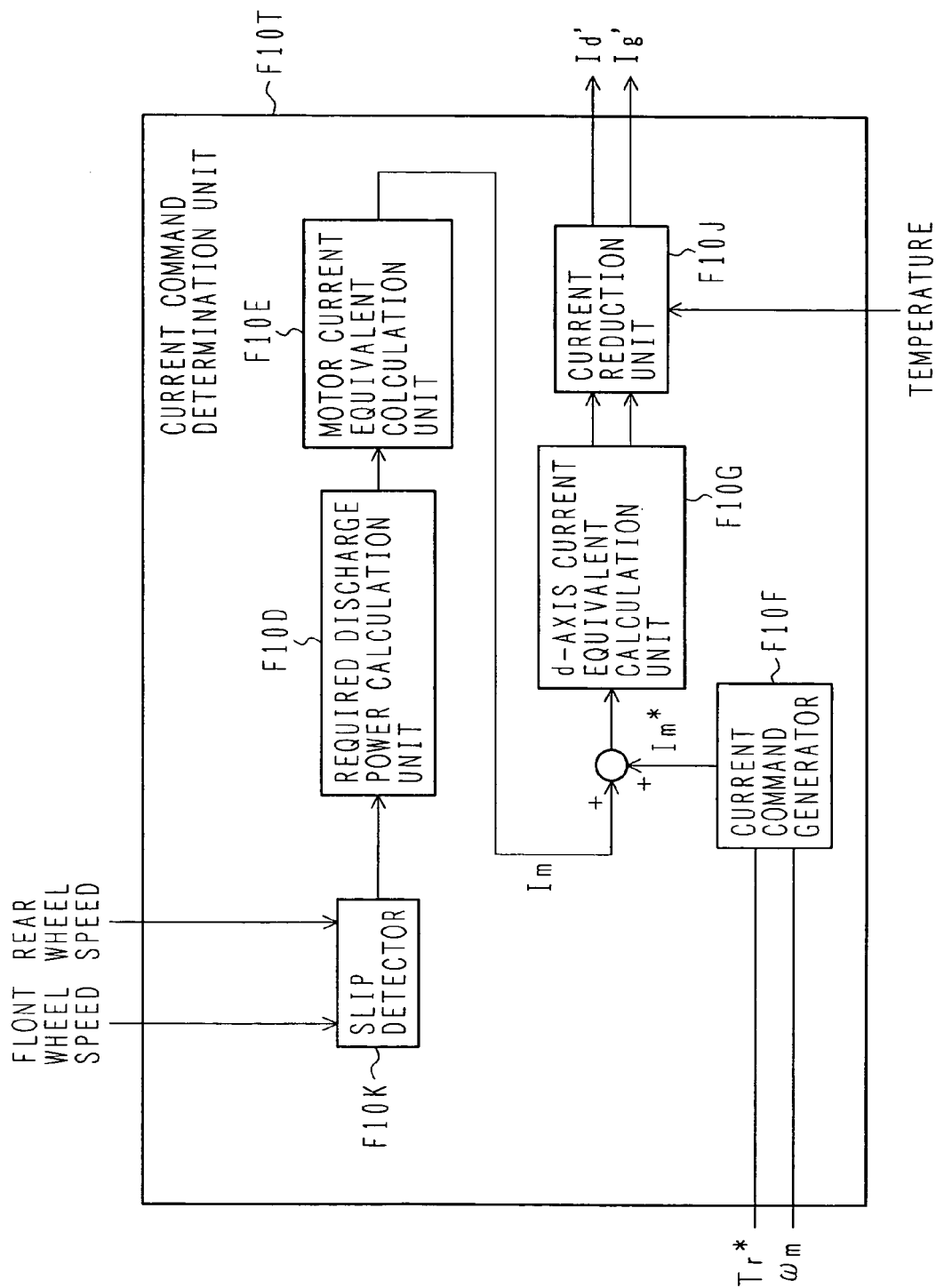
FIG. 13 is a block diagram illustrating the configuration of the current command determination unit that is included in the motor control unit for use in the controller according to a seventh embodiment of the present invention.

FIG. 13 is a block diagram illustrating the configuration of a current command determination unit that is included in the motor control unit for use in the controller according to the seventh embodiment of the present invention. Elements shown in FIGS. 6 and 12 are designated by the same reference numerals when they are identical with each other.

The current command determination unit F10T included in the present embodiment differs from the current command determination unit F10W shown in FIG. 12 in that a slip detector F10K is furnished in place of the excessive power calculation unit F10C'.

When the slip ratio of the front wheels 2 of the electric four-wheel-drive vehicle 1 shown in FIG. 1 exceeds a predetermined value, the rotation speed of the engine 3 may also increase to rotate the generator 4 at an undue speed, thereby generating excessive power. In such an instance, the slip detector F10K detects a slip by comparing the front and rear wheel speeds. If the slip of the front wheels 2 exceeds a predetermined value, the slip detector F10K increases the motor loss. In this instance, the increase in the motor loss is equal to a generated power increase caused by a slip-induced speed increase.

When excessive power is generated, the present embodiment consumes it by increasing the d-axis current, which is included in the motor current, as described above. Therefore, the present embodiment can consume the excessive power while torque changes are minimized.

The system configuration of an electric four-wheel-drive vehicle to which the controller according to the foregoing embodiments of the present invention is applied will now be described with reference to FIG. 14.

Figure 14:
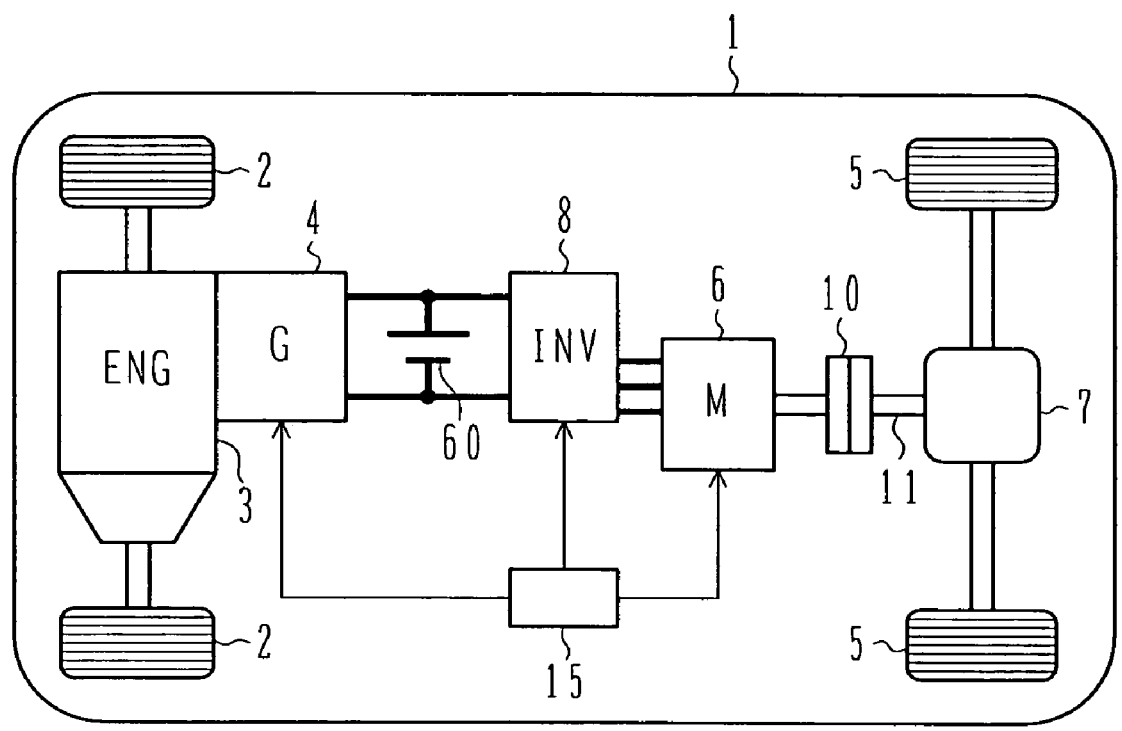
FIG. 14 is a system configuration diagram illustrating an electric four-wheel-drive vehicle to which the controller according to the embodiments of the present invention is applied.

FIG. 14 is a system configuration diagram illustrating an electric four-wheel-drive vehicle to which the controller according to the foregoing embodiments of the present invention is applied. Elements shown in FIGS. 1 and 14 are designated by the same reference numerals when they are identical with each other.

Although the foregoing examples relate to an electric four-wheel-drive vehicle system without a battery, the foregoing embodiments can also be applied to a hybrid system in which a battery 60 shown in FIG. 13 is incorporated. The foregoing embodiments can be applied, for instance, to a situation where the battery 60 is fully charged and cannot be further charged when excessive power is generated from the generator 4 or where the battery 60 cannot be used due to an abnormality in a battery controller.

What is claimed is:

1. A controller for an electric four-wheel-drive vehicle which includes an internal combustion engine for giving driving force to wheels of an automobile, a generator connected to the internal combustion engine for outputting DC power by using rotational power of the internal combustion engine, an inverter for directly converting the DC power, which is output from the generator, to AC power, and an AC motor for driving the other wheels by using an output from the inverter, the controller comprising:
   control means for generating desired torque from the AC motor by controlling the inverter,
   wherein, when the power generated by the generator is larger than the power consumption of the inverter and the AC motor to generate excessive power, said control means consumes the excessive power by increasing a loss in the AC motor,
   wherein, when the loss in the AC motor is to be increased, said control means increases an armature current in the d-axis direction, which is a rotor flux direction of the AC motor.

2. The controller according to claim 1, further comprising power storage means which is connected between an output section of the generator and an input section of the inverter,
   wherein, when the power generated by the generator is larger than the power consumption of the inverter and the AC motor to generate excessive power and the generated excessive power cannot be stored in said power storage means, said control means consumes the excessive power by increasing a loss in the AC motor.

3. The controller according to claim 2, wherein, when a monitored voltage of said power storage means exceeds a predetermined value, said control means judges that the excessive power is generated.

4. The controller according to claim 1, wherein, when an electrical current flowing to the inverter is within a predetermined range from a maximum value, said control means limits a loss increase in the AC motor.

5. The controller according to claim 1, wherein, when the temperature of the inverter or the AC motor rises above a predetermined value, said control means limits a loss increase in the AC motor.

6. The controller according to claim 1, wherein, when the voltage of a smoothing capacitor built in the inverter rises above a predetermined value, said control means judges that the excessive power is generated.

7. The controller according to claim 1, wherein said control means comprises:
   generated power monitoring means for calculating the power generated by the generator; and
   input power monitoring means for calculating the power consumption of the AC motor and the inverter;
   wherein, when an output value generated by said generated power monitoring means is greater than an output value generated by said input power monitoring means by a predetermined value, said control means judges that the excessive power is generated.

8. The controller according to claim 1, wherein, when a slip ratio of the wheels driven by the internal combustion engine exceeds a predetermined value, said control means consumes the excessive power by increasing a loss in the AC motor.

9. A controller for an electric four-wheel-drive vehicle which includes an internal combustion engine for giving driving force to wheels of an automobile, a generator connected to the internal combustion engine for outputting DC power by using rotational power of the internal combustion engine, an inverter for converting the DC power, which is output from the generator, to AC power, power storage means connected between an output section of the generator and an input section of the inverter, and an AC motor for driving the other wheels by using an output from the inverter, the controller comprising:
   control means for generating desired torque from the AC motor by controlling the inverter,
   wherein, when the power generated by the generator is larger than the power consumption of the inverter and the AC motor to generate excessive power and the generated excessive power cannot be stored in said power storage means, said control means consumes the excessive power by increasing a loss in the AC motor,
   wherein, when the loss in the AC motor is to be increased, said control means increases an armature current in the d-axis direction, which is a rotor flux direction of the AC motor.

* * * * *